Figure 2:
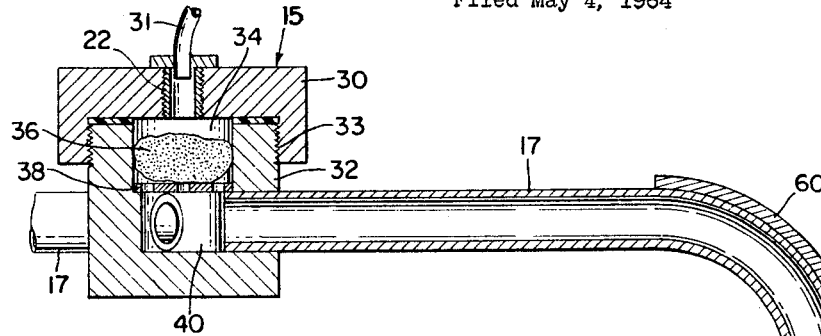

Sept. 20, 1966  E. S. GRAVLIN  3,273,335
MANIFOLD IGNITION SYSTEM FOR SOLID PROPELLANT ROCKETS
Filed May 4, 1964

INVENTORS
EDWARD S. GRAVLIN
FREDERICK L. HAAKE
BY C. E. Vautrain Jr. AGENT
George J. Rubens
ATTORNEY

United States Patent Office 3,273,335
Patented Sept. 20, 1966

3,273,335
MANIFOLD IGNITION SYSTEM FOR SOLID PROPELLANT ROCKETS
Edward S. Gravlin and Frederick L. Haake, both of Oxnard, Calif., assignors to the United States of America as represented by the Secretary of the Navy
Filed May 4, 1964, Ser. No. 364,866
9 Claims. (Cl. 60—35.6)

The invention described herein may be manufactured and used by or for the Government of the United States of America for governmental purposes without the payment of any royalties thereon or therefor.

This invention relates in general to a system for igniting a group of rocket motors and more particulraly to a manifold system for igniting a cluster of solid propellant rocket motors.

It is the general practice in the area of igniting clusters of rocket motors to ignite each motor individually by electrically actuated initiators. Ignition by such means has a number of inherent disadvantages among which are questionable reliability and unnecessary complexity both in operation and in transportation and handling prior to firing of the motors. In any solid propellant ignition system, an arming device is required in addition to the electrical initiator, the arming device and the initiator providing two areas in which a malfunction may occur. Thus, when a number of rocket motors are clustered to form a propulsive stage for a rocket vehicle the number of areas in which an ignition malfunction may occur is a multiple of the number of rocket motors in the cluster.

Another undesirable characteristic of conventionally ignited clusters of solid propellant rocket motors is the number of long delays occasioned between the ignition of individual motors. These delays may occur in any of the three stages in the ignition process, namely, the electrical firing of the initiator or squib, the ignition of a container of ignition mix (usually pellets) by the initiator, and the ignition of the proppellant grain by the ignition mix. The time required from the occurrence of the ignition pulse to complete ignition of the prepellant grain varies considerably from motor to motor and is a function of a thermochemical inter-action between stages in the ignition process. Consequently, although a single ignition pulse may actuate the initiators of all of the motors in a given cluster, the inherent variability in the ignition time for individual motors can produce a considerable delay between the ignition and build-up to full thrust of all motors in a cluster.

The present invention provides a manifold ignition system which eliminates or avoids the disadvantages of conventional means for igniting rocket motor clusters. By the present system, a complete cluster of rocket motors can be quickly armed and made ready to fire by the installation of one electrically actuated initiator or squib. Thus, the system is much simpler than existing systems and also is more reliable in that it requires but one safe and arm device and uses but one electrically actuated initiator for the entire system. Reliability is enhanced by a factor equal to the number of motors in the rocket cluster. If the initiator operates satisfactorily, all motors can be expected to fire, and if the initiator is faulty no motor should fire. Thus, in the event of an initiator malfunction the entire vehicle as well as the booster may be recovered and prepared again for firing. The present invention also permits safe handling of a clustered solid rocket booster and safe shipping as well, including a completely installed manifold ignition system having the primary and main charges but excluding only the electrical initiator. The manifold ignition system of the present invention is adaptable for use with very large clustered solid rocket boosters, with only a minimal increase in weight being necessary due to a moderate increase in the size of the central ignition chamber and the lengthening of passages communicating to the individual rocket motors.

Accordingly, it is an object of the present invention to provide means for reliably igniting clustered solid propellant rocket motors wherein there is a minimum of delay between the ignition of individual units in the cluster.

It is another object of the present invention to provide ignition means for igniting a cluster of solid propellant rocket motors in which the possible areas of malfunction are reduced or substantially eliminated.

It is a further object of the present invention to provide a method and apparatus for quickly arming and readying a complete clustered booster for firing by the installation of a singly electrically actuable initiator.

It is a still further object of the present invention to provide an ignition system for clustered solid propellant rocket motors which will enable recovery of the boosters and vehicle in the event of initiator malfunction.

It is a further object of the present invention to provide an ignition system for clustered solid propellant rocket motors which will enable the cluster to be transported and handled with a complete manifold ignition system installed excluding only the systems single electrical initiator.

Figure 1:
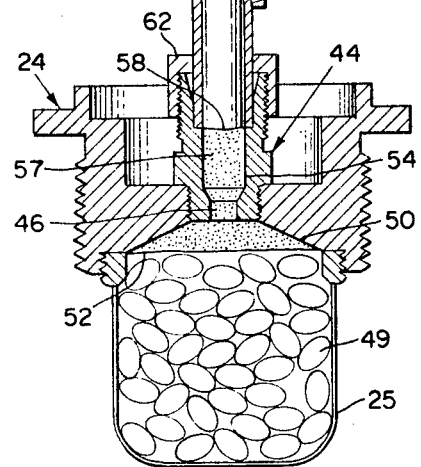
Figure 1:
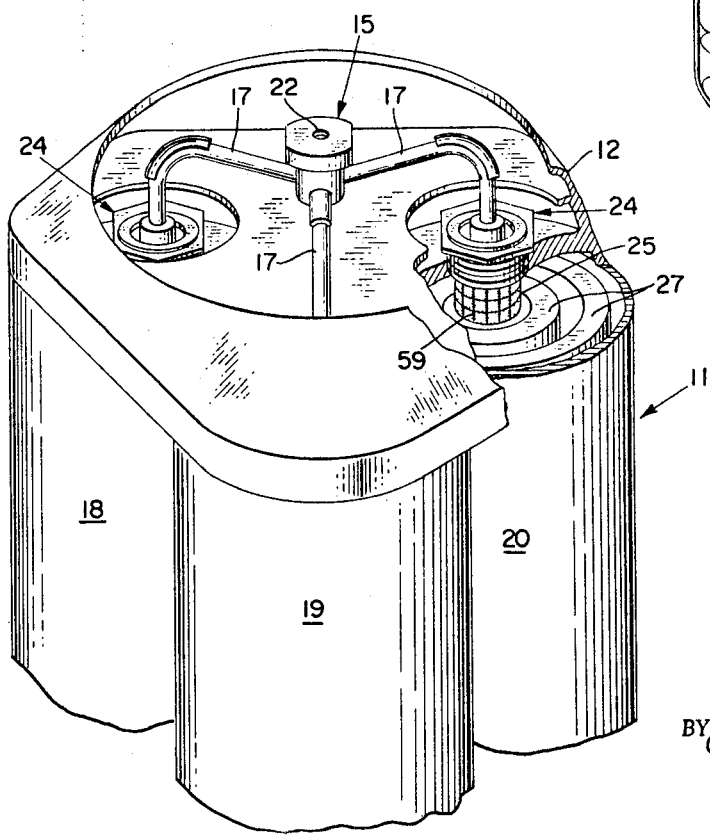

Other objects and many of the attendant advantages of this invention will be readily appreciated as the same becomes better understood by reference to the following detailed description when considered in connection with the accompanying drawings in which like numerals designate like parts throughout and wherein:

FIG. 1 is a prespective view partly in section of the manifold ignition system of the present invention installed in a booster of three clustered rocket motors; and FIG. 2 is a side elevation in cross section of the components of the present manifold ignition system with respect to one of the rocket motors of the cluster.

Referring to FIG. 1, a cluster of three rocket motors is indicated generally at 11, the three motors being contained within booster retaining casing 12. Conduit means such as flame tubes 17 connect a central ignition chamber 15 to each of the respective rocket motors 18, 19 and 20. A central opening 22 in central ignition chamber 15 is adapted to receive an initiation squib 31, shown in FIG. 2, while at the end of flame tubes 17 remote from central ignition chamber 15 are positioned coupler 24 and main charge holder 25 which is disposed at the forward end of and above propellant 27.

The central ignition chamber 15 and other components are shown more in detail in FIG. 2, the chamber 15 including a cap 30 containing the opening 22 into which is fitted an initiator such as electrically operated squib 31. The cap 30 is secured to the chamber body 32 by conventional means such as threads 33 shown in FIG. 2. The chamber body 32 has an internal cavity which is separated by a perforate member such as a heavy screen or filter plate 38 into an upper, combustion, chamber 34 and a lower, plenum, chamber 40 from which the flame tubes 17 lead to the forward ends of the motors. In the combustion chamber 34 is placed a primary charge 36, which in the present embodiment includes magnesium-Teflon powder contained in a polyethylene bag. Tubes 17 connect into plenum chamber 40, the tubes 17 being secured to chamber body 32 by welding or silver soldering as shown or by other methods such as threaded fittings.

The flame tubes 17 terminate in sealed fittings such as "swagelok" tube fittings 44 which are threaded into coupler 24. Each fitting 44 provides in effect a passage continuation of its flame tube 17 and includes an area 46 which is of diminished cross section from the inner diameter of the tube 17. Main charge holder 25 is threaded into the lower extremity of coupler 24 and contains the main charge which may comprise a quantity of ignition pellets 49 that are separated from the tapering portion 50 of coupler 24 by a plastic film diaphragm 52 which is cemented in place. The tapering portion 50 as well as the lower portion 54 of fitting 44 are filled with a secondary charge such as magnesium-Teflon powder 57. The upper surface of secondary charge 57 is closed off by aluminum foil diaphragm 58 which is cemented in place. Main charge holder 25 in the present embodiment is in the form of a basket the mesh of which is enclosed by a plastic film 59 such as is indicated in FIG. 1.

The manifold 15, flame tubes 17 and couplers 24, including fittings 44, are, in the present embodiment, fabricated from stainless steel. It will be appreciated, however, that these components may be made of other material having similar heat and corrosion resistant characteristics within the concept of the invention. Flame tubes 17 are silver-soldered to the lower body portion 32 in the present embodiment and may be reinforced in their curved portions by the use of stainless steel strips 60 welded to the outside surface of the curve. It will be appreciated that other means for reinforcing this area such as applying special coatings on the flame tube inner wall may be adopted within the concept of the invention. Perforate member 38 may be a stainless steel plate perforated as shown, or other filtering means, and serves to confine the ignition mix within the combustion chamber until combustion is completed such that no unburned ignition mix or at most only very small particles or products of combustion may enter plenum 40 thereby avoiding temporary obstruction of the flame tubes. To provide added sealing between the outer periphery of the flame tubes 17 and the inner periphery of "Swagelok" fittings 44 which include cap 62, a thin layer of a compound such as "Sauereisen No. 7" paste, which is an air drying ceramic material, may be applied before the cap 62 is tightened into the fitting 44. If such a paste is used, some of it may be squeezed down into the threads and will serve to lock the cap and prevent it from inadvertently loosening as well as to seal the flame tube to the fitting thereby preventing leakage.

Magnesium-Teflon charges have been selected for use with the present embodiment of the invention, it having been determined that this powder enhanced the operation of the device by reducing the time of spread between the first indication of flame at the ends of the flame tubes. The ignition of the main charges was considerably reduced by the use of this powder over other ignition mixtures. Other charges having the desired characteristics may be used within the inventive concept.

The flame tubes 17 are reinforced to obviate the occurrence of a failure of these tubes due to a difference of chamber pressure between the individual motors in the booster or cluster. Erosion of the flame tubes is to be expected since a pressure differential of as much as 200 p.s.i. could occur between individual motors producing a considerable amount of flow with a consequent high heat transfer rate and heavy erosion at the flame tube elbow where the flow is turned.

The use of secondary charges to promote ignition of the main charge 49 significantly enhances the ignitability of the main charges. The area 46 of diminished diameter in the flame passage serves to promote a greater degree of simultaneity in the ignition of secondary charges 57 since the slight restriction serves to impede the flow of gases in some tube or tubes 17 until a substantially equal pressure exists throughout the various flame tubes 17. Thereafter, passage of the hot gases through the openings 46 is substantially simultaneous.

The ignition sequence for the device of this invention begins with the firing pulse which sets off the initiator squib 31 which in turn causes ignition of the magnesium-Teflon primary charge 36. Flame from the combustion of charge 36 propagates through the perforations in member 38 and then along the flame tubes 17. The force of the expanding hot gases serves to push secondary charge 57 through openings 46 and into the main charge holder 25 where intermingling with the pellets 49 occurs. The flame then is slightly impeded by the areas of diminished diameter 46 until it ignites each of the secondary charges 57 substantially simultaneously. The secondary charges 57 then in turn ignite the main charges 49 contained in the main charge holder 25, after which the main charges ignite the propellant grains 47.

The present invention is inherently more reliable than conventional devices for igniting the several rocket motors in a rocket motor cluster simultaneously or substantially simultaneously because its relative simplicity renders the entire ignition system much less susceptible to the danger of malfunction. Only one mechanical safe and arm operation is required in the present system, and only one electrically actuated initiator suffices for the entire manifold ignition system. By having the mechanical safe and arm function performed by a single initiator, the entire cluster of motors and the manifold ignition system may be assembled before shipment and may be shipped and set up for firing with all charges completely in place except for the installation of the initiator. These characteristics provide for a quicker and safer preparation and transportation of rocket motors in the clustered form. The manifold ignition system of the present invention may be applied to very large clustered solid rocket boosters with but a slight increase in weight.

The overall functioning of the system is particularly enhanced by the positioning of the primary charge in the upper portion of the cavity in the chamber body 32. The relatively small reduction in diameter of the flame passage in the portion remote from the primary charge serves to bring the firing of the secondary charges into approximate simultaneity.

It will be appreciated that the present invention may be applied to other ignition systems within the concept of the invention, for example, it may be applied to a pyrogen igniter, which is an igniter in which the deflagration of the primary charge directly ignites the solid propellant. In such an application, central ignition chamber 15 would necessarily be enlarged to facilitate a much greater primary charge, and the flame tubes could be equipped with nozzles to cause the flame to impinge directly on the propellant grains.

It will be recognized therefore that many modifications and variations of the present invention are possible in the light of the above teachings. It is therefore to be understood that within the scope of the appended claims the invention may be practiced otherwise than as specifically described.

What is claimed is:

1. A manifold ignition system for igniting substantially simultaneously a cluster of rocket motors comprising:
    a primary charge disposed in a central ignition chamber remotely positioned from said rocket motors for propagating high temperature combustion products to be communicated to each of the rocket motors;
    a plurality of ignition means disposed one each adjacent to the propellant of each of the rocket motors;
    conduit means for communicating said combustion products individually to each of the rocket motors; and
    said means for communicating including a portion which has an area of diminished cross section at its end remote from said central ignition chamber so that said combustion products are communicated substantially simultaneously to the rocket motors by the delay occasioned by said area of diminished cross section in said conduit means.

2. The device as defined in claim 1 wherein said central ignition chamber includes an upper portion for accommodating combustion and a lower portion for effecting distribution of the products of combustion to said rocket motors.

3. The device as defined in claim 2 and further including perforate means separating the upper and lower portions of said central combustion chamber.

4. The device as defined in claim 3 wherein said perforate means is a filter;
said filter serving to confine the primary charge to the upper portion of the central ignition chamber thereby preventing all but very small uncombusted particles from entering said means for communicating.

5. A manifold ignition system for igniting substantially simultaneously a cluster of rocket motors comprising:
a central ignition chamber wherein a rapid deflagration of ignition materials to be communicated to the rocket motors is initiated;
a primary charge in said central ignition chamber;
a squib for initiating said primary charge;
a plurality of main charges disposed one each adjacent to the propellant of each of the rocket motors;
a plurality of secondary charges disposed one each adjacent to each of said main charges; and
conduit means for communicating high temperature gases generated in said central ignition chamber to each of said secondary charges;
said conduit means including gas flow restricting means for delaying said high temperature gases from igniting any of said secondary charges until all of said secondary charges may be ignited substantially simultaneously.

6. The device as claimed in claim 5 and further including means separating said central ignition chamber into an upper combustion portion for accommodating combustion of said primary charge and a lower plenum portion for effecting distribution of the products of combustion to said means for communicating so that the number of uncombusted particles of ignition materials entering said means for communicating will be substantially reduced.

7. The device as claimed in claim 6 wherein said secondary charges are partially disseminated into said main charges before combustion of said secondary charges.

8. The device as claimed in claim 7 and further including diaphragm means enclosing said secondary charges, said diaphragm means being readily rupturable by the force of the high temperature gases so that upon rupture of said diaphragm means said secondary charges will be at least partially disseminated into said main charges.

9. An ignition system for effecting common ignition of a plurality of solid propellant grain rocket motors comprising:
a central chamber communicating with the forward end of each of said rocket motors;
a primary charge positioned in said chamber;
a squib for initiating said primary charge;
a secondary charge in each of said rocket motors;
tube means communicating between said primary charge and each of said secondary charges;
said tube means having an area of diminished diameter adjacent each rocket motor for dispersing the deflagration resulting from ignition of the primary charge substantially simultaneously to each secondary charge; and
a main charge associated with each secondary charge and the propellant grain of the respective rocket motor;
whereby upon ignition of said squib said primary charge will be ignited which in turn will ignite each of said secondary charges, the latter igniting the main charge associated therewith and thereafter the propellant grains of the respective rocket motors with a minimum of delay between the ignition of each of the said plurality of rocket motors.

References Cited by the Examiner

UNITED STATES PATENTS

| | | | |
|---|---|---|---|
| 2,976,805 | 3/1961 | Africano et al. | 102—49 |
| 2,990,683 | 7/1961 | Walden | 60—35.6 |
| 3,011,441 | 12/1961 | Gordon | 102—70 |
| 3,027,839 | 4/1962 | Grandy et al. | 102—27 |
| 3,129,561 | 4/1964 | Priapi | 60—35.6 |
| 3,166,899 | 1/1965 | Keathley | 60—35.6 |
| 3,170,287 | 2/1965 | Adelman | 60—35.6 |
| 3,217,489 | 11/1965 | Thurston et al. | 60—39.82 X |

MARK NEWMAN, *Primary Examiner.*

CARLTON R. CROYLE, *Examiner.*